July 7, 1970  D. DANIELS  3,518,908
PUNCH PRESS

Original Filed Feb. 6, 1967  10 Sheets-Sheet 1

INVENTOR.
DENNIS DANIELS

BY
ATTORNEYS

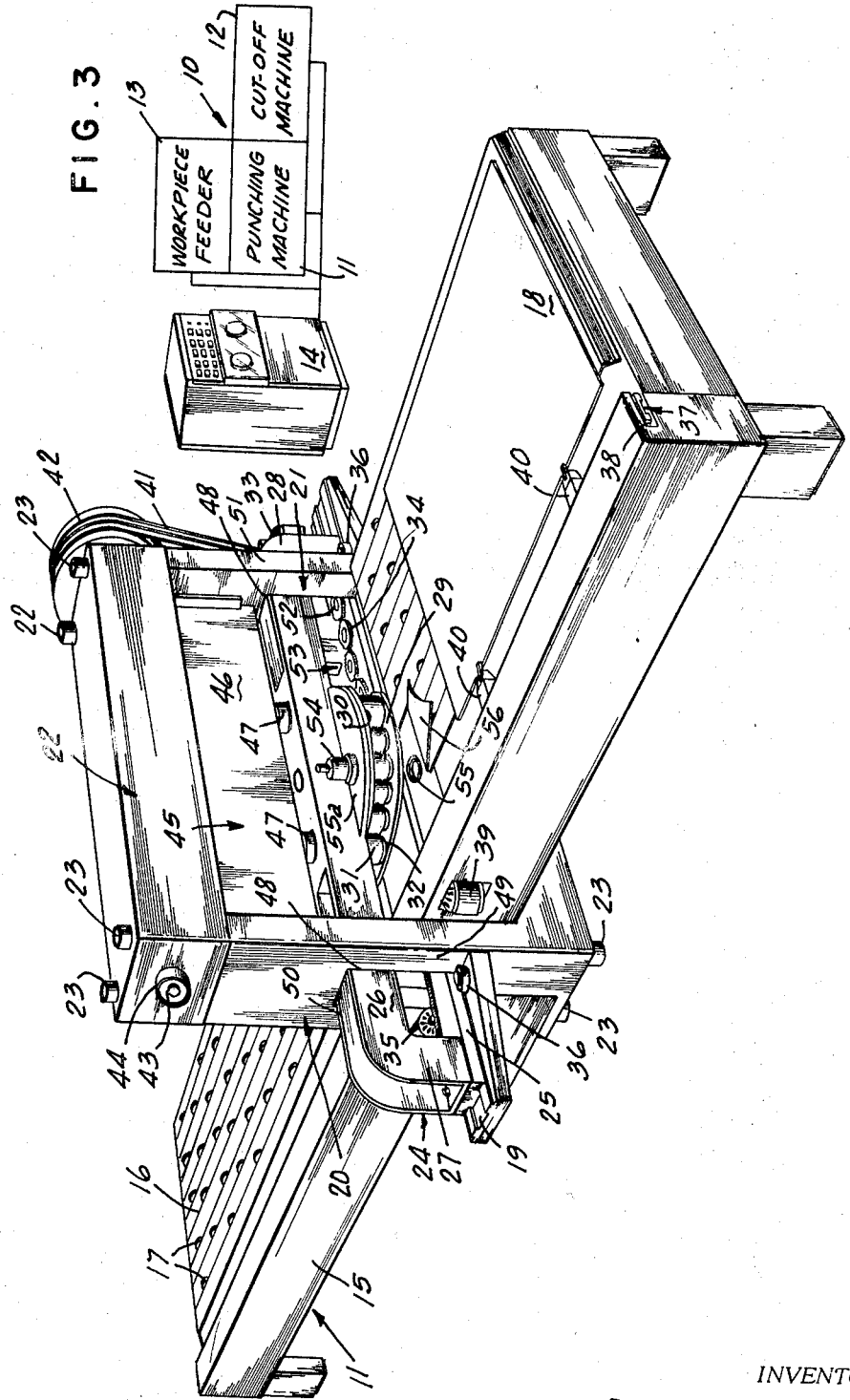

July 7, 1970 D. DANIELS 3,518,908
PUNCH PRESS

Original Filed Feb. 6, 1967 10 Sheets-Sheet 3

INVENTOR.
DENNIS DANIELS
BY ATTORNEYS

July 7, 1970    D. DANIELS    3,518,908
PUNCH PRESS
Original Filed Feb. 6, 1967    10 Sheets-Sheet 4

INVENTOR.
DENNIS DANIELS
BY  ATTORNEYS

INVENTOR.
DENNIS DANIELS

ATTORNEYS

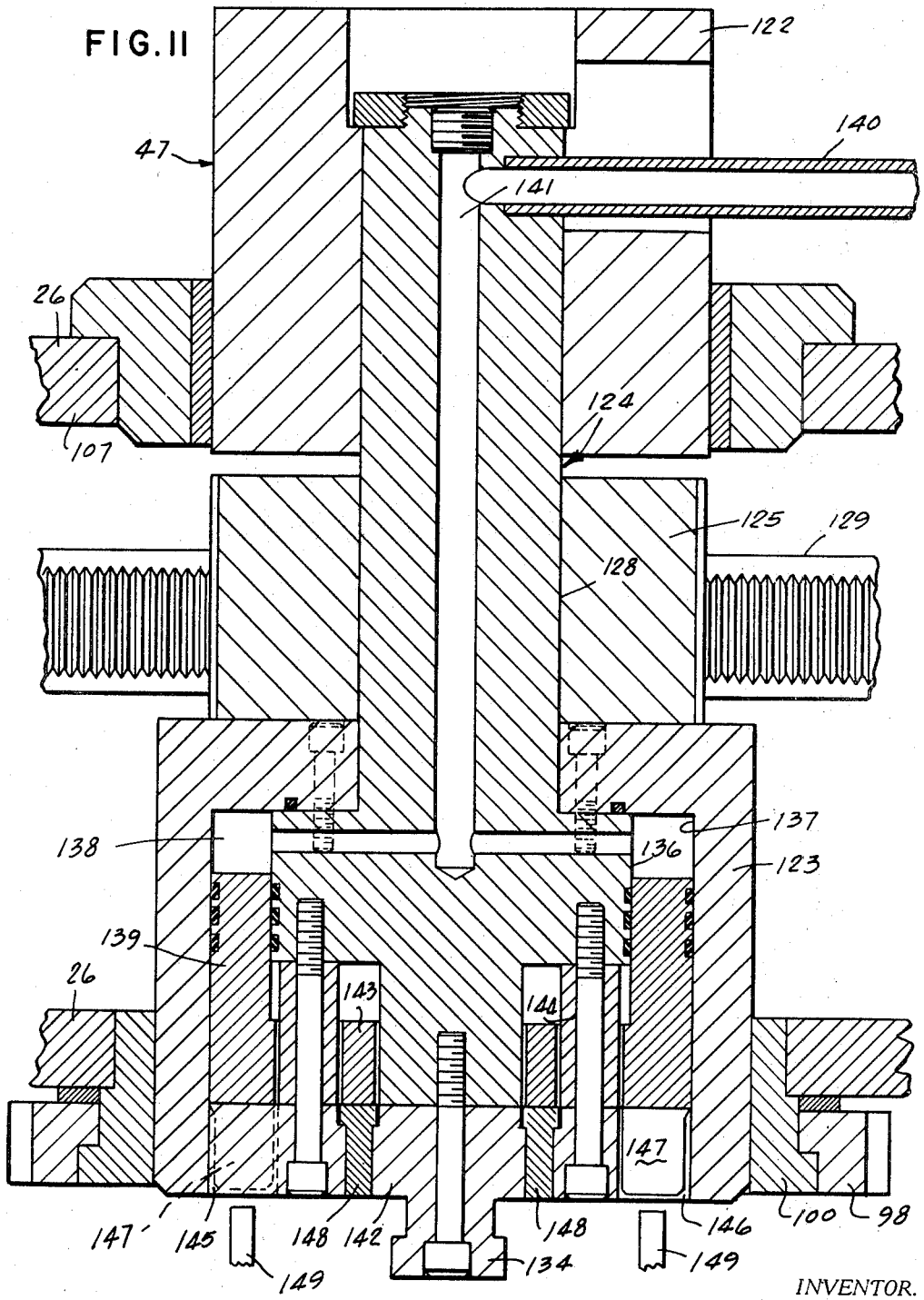

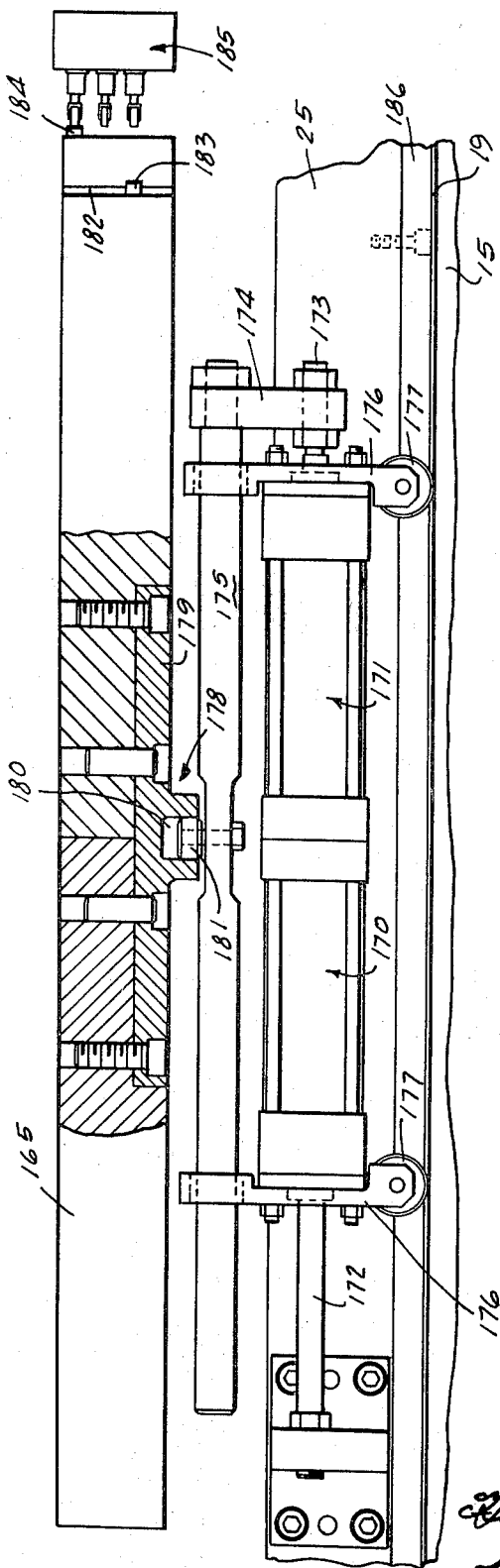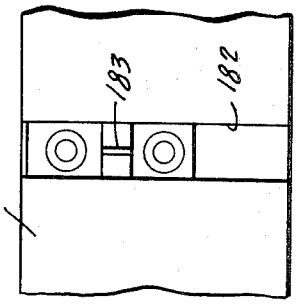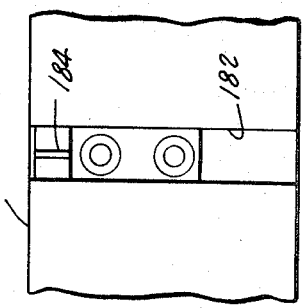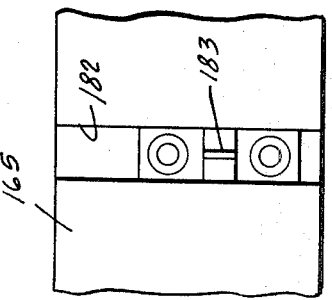

United States Patent Office 3,518,908
Patented July 7, 1970

3,518,908
PUNCH PRESS
Dennis Daniels, Williamsville, N.Y., assignor to Houdaille Industries, Inc., Buffalo, N.Y., a corporation of Michigan
Original application Feb. 6, 1967, Ser. No. 629,335, now Patent No. 3,449,991, dated June 17, 1969. Divided and this application Jan. 14, 1969, Ser. No. 791,052
Int. Cl. B26d 5/08, 5/30
U.S. Cl. 83—137                                13 Claims

ABSTRACT OF THE DISCLOSURE

A numerically controlled punching machine feeds the workpiece in the X-axis over a stationary base, the base also supporting a D-shaped frame for movement in the Y-axis. Means are provided to support tooling of more than one envelope size. A power-driven bolster allows for use of dies having various outside diameters. The base supports a driven ram which has fluid-pressurized means for actuating a stripping element associated with the punch, and the numerical control means further controls workpiece cut-off means adjacent to one end of the base.

RELATED APPLICATIONS

This application is a division of my copending application, Ser. No. 629,335, filed Feb. 6, 1967, and now Pat. No. 3,449,991, which earlier application is a continuation-in-part of an application filed Feb. 21, 1966, Ser. No. 528,856 and now abandoned.

BACKGROUND OF THE INVENTION

Field of the invention

This invention relates to the structure employed in a heavy-duty punch press of the type that is adapted to be numerically controlled, and more specifically is directed to a punch press of the type which employs standardized interchangeable tooling.

Prior art

Punching machines as known in the past, particularly of the turret type, have involved using tooling having a fixed external envelope at a particular punching station. If the station is large and the hole to be made is small, tooling having large external dimensions has been used heretofore in order to fit such station. This applies not only to the punch portion of the tooling, but also to the die. Thus it has been impractical and heretofore impossible to use at a particular station a die having a large hole, and at a later time, a die having an external size even smaller than the hole referred to. Further, as the size of the opening to be made increases, and as the thickness increases, the tonnage capacity necessarily must be increased as must be the stripping capacity to to the point where previously known stripping means have been impractical or incapable of reliable use.

SUMMARY OF THE INVENTION

The punch press of the present invention employs means for enabling the use of tooling having various envelope sizes, and the punch ram is constructed to utilize fluid pressures to effect stripping of the workpiece from the punch. Numerical control means of the punch press regulate a cut-off means.

Accordingly, it is an object of the present invention to provide a punch press which is capable of operating on relatively large workpieces.

A further object of the present invention is to provide a punch press constructed to utilize tooling having various envelope sizes.

Another object of the present invention is to provide means by which fluid pressure may be employed to strip the workpiece from the punch.

Another object of the present invention is to provide a metal-working machine of the numerically controlled type wherein such controls also regulate a cut-off means.

Many other advantages, novel features and additional objects of the present invention will become manifest to those versed in the art upon making reference to the detailed description and the accompanying sheets of drawings in which a preferred structural embodiment incorporating the principles of the present invention is shown by way of illustrative example.

FIG. 2 is a perspective view of the punch press of FIG. 1 wherein certain shrouds and covers have been removed;

FIG. 3 is a perspective-diagrammatic view of the entire machine of FIG. 1;

FIG. 11 is a cross-sectional view taken through one of the ram assemblies;

FIG. 13 is an end view of the bolster shown in FIG. 12 illustrating its drive; and FIGS. 14–16 are enlarged fragmentary views of portions of the bolster shown in FIG. 13 illustrating binary switching.

GENERAL DESCRIPTION OF STRUCTURE

Figure 1:
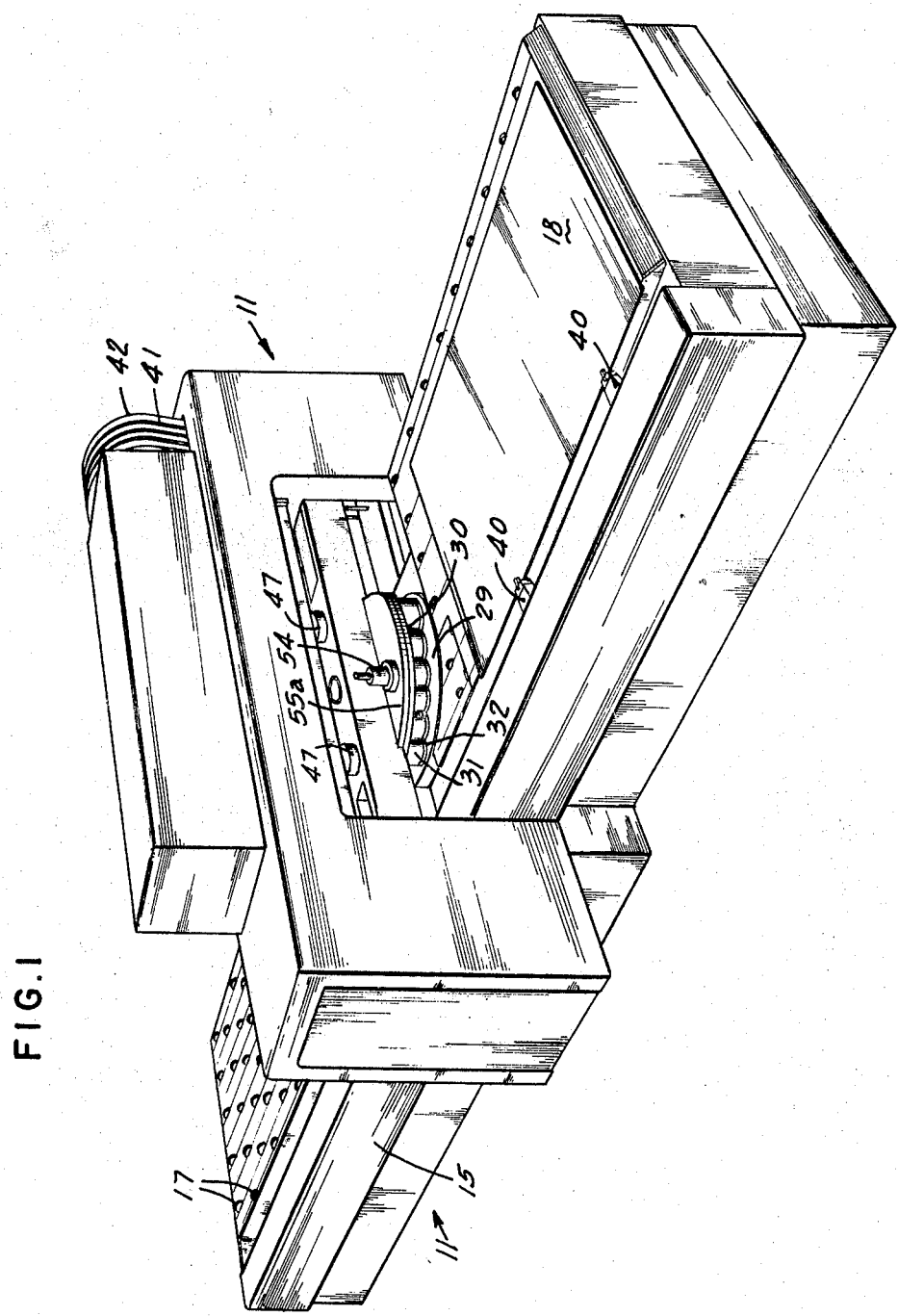
FIG. 1 is a perspective view of an automatic punch press constructed in accordance with the principles of the present invention.

This invention is particularly useful when embodied in a punch press or punching machine such as illustrated in FIG. 3, generally indicated by the numeral 10. The automatic puch press 10 includes a punching machine 11 which is provided with workpiece cut-off means or a cut-off machine 12, a workpiece feeder 13, and a numerical control means 14.

The workpiece cut-off means 12 is of conventional construction, and is disposed adjacent to one end of the base of the punching machine 11 for acting on the workpiece. The workpiece feeder 13 is disposed adjacent to the punching machine for placing workpieces on the machine to enable punching operations to be made thereon. The workpiece feeder itself is of conventional construction. The numerical control means 14 is likewise of conventional construction. However, a novel aspect of the present invention is that the numerical control means 14 not only controls the punching machine 11, but also controls operation of the cut-off machine 12 and the workpiece feeder 13 to provide a completely integrated or synchronized device. The numerical control means 14 in positioning a workpiece on the punching machine 11 also inherently positions the workpiece in a precise predetermined place for precise control of the point on the workpiece at which the cut-off means is to act.

The punching machine or punch press 11 is seen in perspective in FIG. 1, and for the purpose of this specification, is better seen in FIG. 2 which illustrates the punch press 11 with certain shrouds and covers removed, thereby revealing in a better manner the actual structure of the machine or press 11.

THE BASE

The punch press 11 includes a fixed table or base 15 which is adapted on its upper surface as at 16 to support a workpiece at work bench height. The workpiece support surface 16 is provided with a number of rollers 17 throughout its extent against which a workpiece 18 actually engages. The length of the base 15 is substantially twice the length of the longest workpiece that can be handled without regrasping of the workpiece, and the effective width of the fixed table or base 15 is substantially the same as the maximum width of workpiece 18 that can be handled. The workpiece 18 moves linearly by means described below while supported by the rollers 17, such movement being referred to herein as movement in the X-axis. The workpiece 11 is not moved in the Y-axis during repositioning thereof.

The base 15 further includes a support surface 19 which is downwardly recessed from the plane in which the workpiece 18 is moved. From the support surface 19, there extends upwardly, at opposite sides of the base 15, a number of upwardly extending portions generally indicated by the numerals 20, 21. The upwardly extending portions 20 and 21 in a sense comprise straight sides of the press 11, between which sides the workpiece 18 is fed for passing therethrough.

The base 15 further includes a span structure generally indicated at 22 which is supported by the upwardly extending portions 20, 21, which connects them together to define a rigid structure. The spanning structure 22 is held to the lower portion of the base 15 by means of four tie rods or elongated bolts 57 (FIGS. 4 and 7) which thread into larger nuts 23 at their upper end, and into similar nuts 23 at their lower ends.

THE MOVABLE FRAME AND TURRETS

The recessed transverse support or slide surface 19 slidably supports a frame or bridge generally indicated at 24 which includes a pair of spaced arms 25, 26 which are rigidly joined together at their opposite ends as at 27, 28. The lower arm 25 in a broad sense is a movable bolster. The arms 25, 26 respectively support a pair of turrets 29, 30. The turret 29 is rotatably supported on the lower arm 25, and the upper turret 30 is rotatably supported on the upper arm 26. The turrets 29 and 30 are each provided with a like number of stations or means for supporting cooperative tooling. The turrets 29, 30 are thus supported between the arms 25, 26, are supported by such arms, and their rotational axes coincide. However, the turrets 29, 30 are spaced from each other so that the workpiece 18 can pass therebetween, and the punch and die tooling carried by the turrets 29, 30 is engageable with opposite sides of the workpiece.

The punch and die tooling used in the turrets 29, 30 can be of conventional construction and is received in the nests or stations by a slip fit, coupled with suitable detent means or the equivalent to hold the same vertically in place. Typically, the tooling is that provided to enable punching of holes in the workpiece 18 or to enable the cutting of notches therein. The upper turret 30 has a number of tooling stations such as illustrated at 31 while the lower turret 29 has a number of die-receiving stations 32. The turrets 29, 30 thus comprise a rotary tool index whose rotational axis is fixed with respect to the frame or bridge 24, but such pair of turrets 29, 30 is movable in the Y-axis only in response to displacement of the frame 24 on the support surface 19.

In order to rotate the turrets 29, 30 there is provided motor means 33, here comprising a single motor, which drives connecting means 34 leading to both turrets 29, 30. The connecting means 34 thus drivably couples the motor means 33 to the pair of turrets. To facilitate the passing of the workpiece between the turrets 29, 30, the connecting means 34 preferably comprises two separate branches, each of which branches is here a series of gears.

In order to move the bridge or frame 24 in the Y-axis, there is provided a motor 35 which acts between the base 15 and the frame 24, on which motor 35 there is a pinion which coacts with a rack 58 (FIG. 4) on the lower arm 25. A number of guidance rollers 36 are provided at the upwardly extending portions 20, 21, which guidance rollers 36 engage the frame 24 at the lateral sides of the lower arm 25 thereof.

In order to move the workpiece 18 in the X-axis, there is provided means generally indicated at 37 secured to or carried by the base 15 for moving the workpiece, such movement being in a direction transverse to the movement of the frame 24, and parallel to the plane of the workpiece 18. The means 37 include an elongated rigid member, an end of which is visible at 38, which extends for approximately one-half the length of the base 15. The elongated rigid member 38 is shown in a retracted position in FIG. 2 which is as far to the right as it can move, and its other end is drivably engaged by a motor 39 carried by the base 15, the motor 39 comprising a hydraulic servo that is provided with a precision pinion acting on a precision rack 59 (FIG. 4), the rack forming part of the elongated member 38. Secured to the elongated rigid member 38 is a pair of hydraulically actuated clamp means 40 which grasp the adjacent edge of the workpiece 18.

THE RAM STRUCTURE

Figure 7:
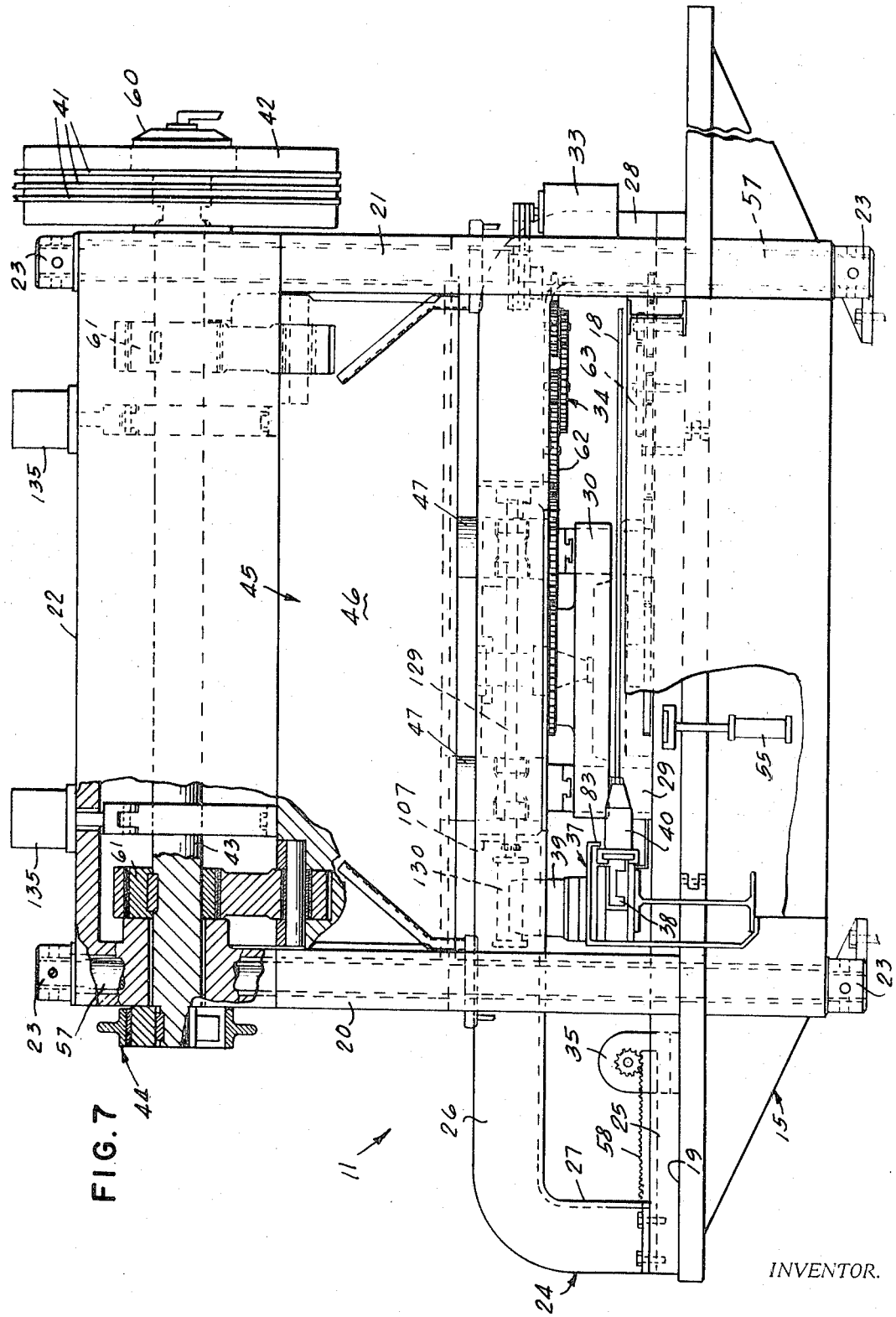
FIG. 7 is an end view of the punch press with parts broken away and others shown in cross section.

When the workpiece 18 has been positioned in the X-axis by the positioning means 37, when the turrets 29, 30 have been rotated to place the selected tooling stations 31, 32 in operating position, when the frame 24 has been driven by the motor 35 to place the selected tooling stations 31, 32 in the proper position in the Y-axis, the workpiece 18 is then ready for being punched. To effect relative reciprocation of the selected tooling carried by the turrets 29, 30, there is provided a ram motor which is not illustrated, which drives a number of belts 41 which extend about an enlarged pulley-type flywheel 42. If desired, such motor could be disposed on the span structure 22 with the belts 41 extending upwardly (FIG. 7). The flywheel 42 rotates continually and includes a conventional remotely controlled clutch for transmitting the dynamic energy to a shaft 43 that is also provided with a brake 44. The shaft 43 is provided with suitable eccentrics to operate ram means generally indicated at 45. The shaft 43 preferably carries the flywheel at the end more remote from the operator's station.

The ram means 45 include a driven ram 46 which is slidably supported at its ends by the upwardly extending portions 20, 21 of the base 15. The ram means 45 further includes at least one ram assembly 47, and preferably includes two such ram assemblies 47 as shown. The ram assemblies 47 are slidably guided by the upper arm 26 of the frame 24, and are spaced apart so as to register with diametrically opposite tooling stations on the turrets 29, 30. Thus the ram assemblies 47 move in the Y-axis with the frame 24. The weight of the ram means 45 is entirely supported by the base 15, while being only slidably guided by the frame 24. Each of the ram assemblies 47 is alternatively operable by means of internal structure which can be selectively actuated so that the driven ram 46 will transmit power only to one of such ram assemblies 47, whereby only the tooling at one of the diametrically opposite tooling stations is actuated.

GENERAL OPERATION

On actuation of the clutch within the flywheel 42 and release of the brake 44, energy thus is transmitted by the driven ram 45 to the selected one of the ram assemblies 47 to actuate the selected aligned tooling in the stations 31, 32. The tooling in the lower station 32 is supported by apertured slug-receiving means in the nature of an adjustable bolster or bolster section, described below, within the bolster or lower arm 25, and the upper tooling is merely guided by the structure described.

The upwardly extending means 20, 21 are provided with a first space or aperture 48 through which the frame 24 passes, the frame 24 thus being straddled by four leg-like portions 49–52. Each of the legs 49–52 thus has a first space at one side of it through which the frame 24 extends, and a second space 53 on another side of it for receiving the workpiece between it and an adjacent leg. The upwardly extending portions 20, 21 of the frame 15 are thus disposed also at opposite sides of the tool-support means 29, 30 and overlie the frame 24 so that the frame end can pass through adjacent end portions of the base 15. The portions 20, 21 thus also jointly support at least part of the ram means 45.

By means of the structure of the base 15 described, the workpiece 18 is afforded full and continuous support.

TOOL LOADING

Means are provided for loading and unloading the co-operative tooling into the turrets 29, 30. To this end, there is provided a tooling ejector 54 which is carried on a bracket 55a secured to the frame 24. The size of the opening in the lower turret 29 which receives the lower portion of the tooling, such as the die, is made larger than the corresponding opening in the station of the turret 30 directly thereabove. The tool ejector 54 is in the nature of a remotely actuatable plunger which engages the slidably held tooling in the upper turret 30, forcing it out of position and into nesting engagement with the lower tooling, and to force all such tooling out through the lower dial or turret 29 into a suitable nest or the like immediately below the lower turret 29.

Similarly, there is provided below the lower turret 29, a tooling loader 55 which is carried by means that are carried by the base 15. The tooling loader is in the nature of a plunger that has a nest at its upper end which forces the tooling upwardly through the larger opening in the lower turret 29 so that the tooling for the upper turret passes therethrough and is received in the station thereabove. The tooling loader serves as the receiving nest for accepting tooling ejected by the tooling ejector 54. Access to the space beneath the lower turret is obtained by pivoting a cover or door 56 which is shown in the open position in FIG. 2 and in the closed position in FIG. 1.

CONTROLS

Although any of the functions and controls described can be sequenced or operated by hand, it is preferred to employ the numerical control means 14 described. Use of the numerical control means 14 enables many of the controls to be simultaneously actuated. For instance, the workpiece 18 may be moved in the X-axis while the frame 24 is being moved in the Y-axis while the turrets 29, 30 are being rotated. Also, simultaneously therewith, the controls for the zero-offset feature, namely the control for selecting which of the ram assemblies 47 shall be operative, may also then be operated concurrently with the aforesaid group of functions.

The numerical control machine may operate the cut-off means 12 at the same time that it is calling for operation of the driven ram 46. The control of the workpiece feeder 13 and of the workpiece clamps 40 would necessarily precede the foregoing functions.

The foregoing structure is particularly advantageous in that there is no table that is moved in the X-axis, thereby minimizing the amount of mass and hence the inertia problems inherent in table movement, a fact which facilitates the obtaining of maximum positioning accuracy.

FURTHER BASE DETAILS

Figure 4:
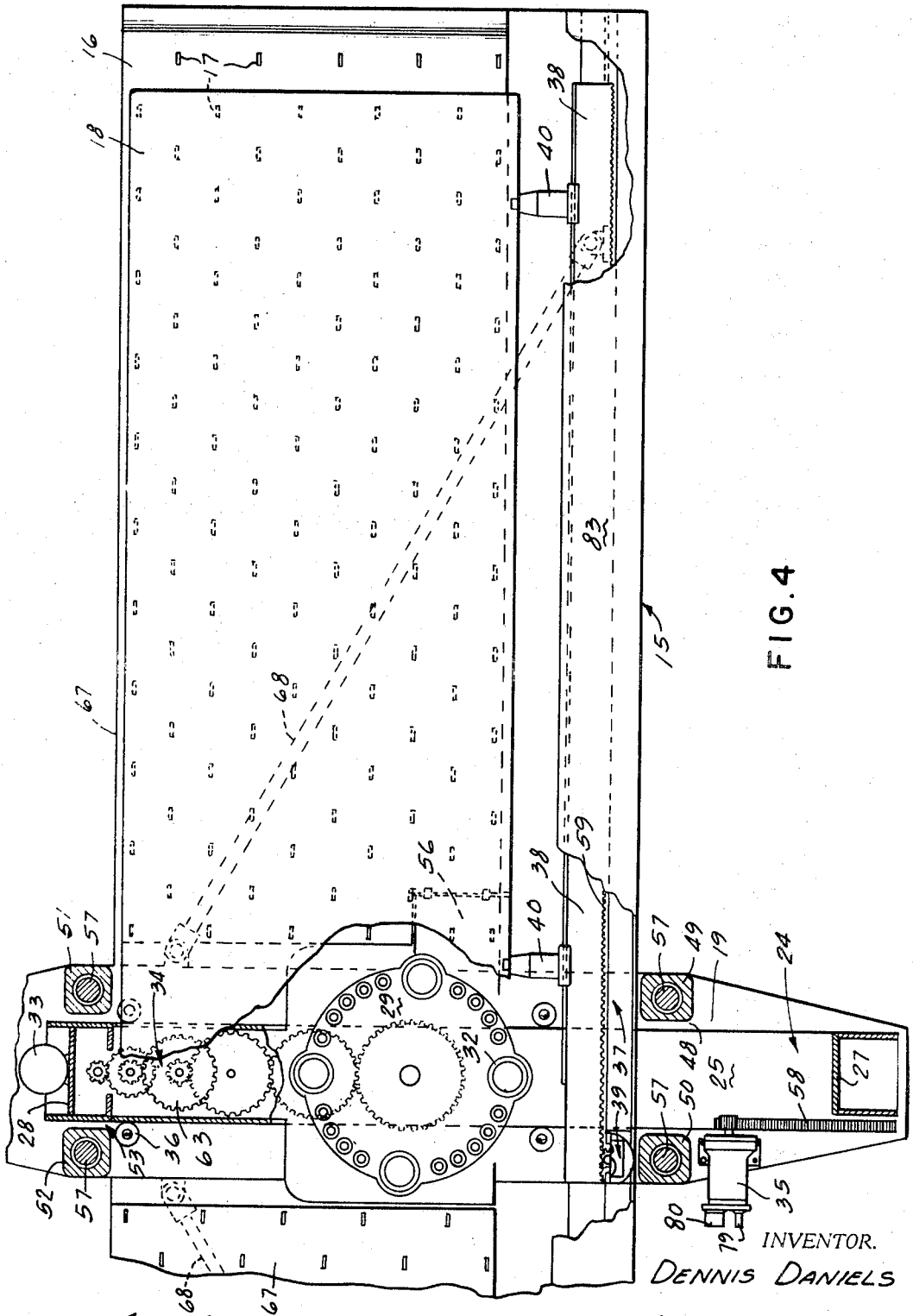
FIG. 4 is a fragmentary top view of a punch press as shown in FIG. 2, with parts broken away and cross-sectioned.

The base 15 is considered large, extending for about ten feet from either side of the frame support member 19. To facilitate the fabrication thereof, the base is made in portions or sections wherein a table portion 67 extends horizontally from the frame support member 19, and a second table portion 67 extends similarly in the opposite direction. The table portions 67 support the workpiece moving means and also fully underlie the workpiece 18. A pair of connecting means illustrated schematically at 68, 68 in FIG. 4, are each connected between one of the table portions 67 and the frame support member 19 and provide means to adjust the squareness between the direction that the frame 24 is movable, with respect to the direction that the workpiece 18 is movable. If desired, and if suitable anchoring were utilized, either one of the table portions 67 could be constructed to be ahead of the transverse support member 19.

X-AXIS MECHANISM

Figure 5:
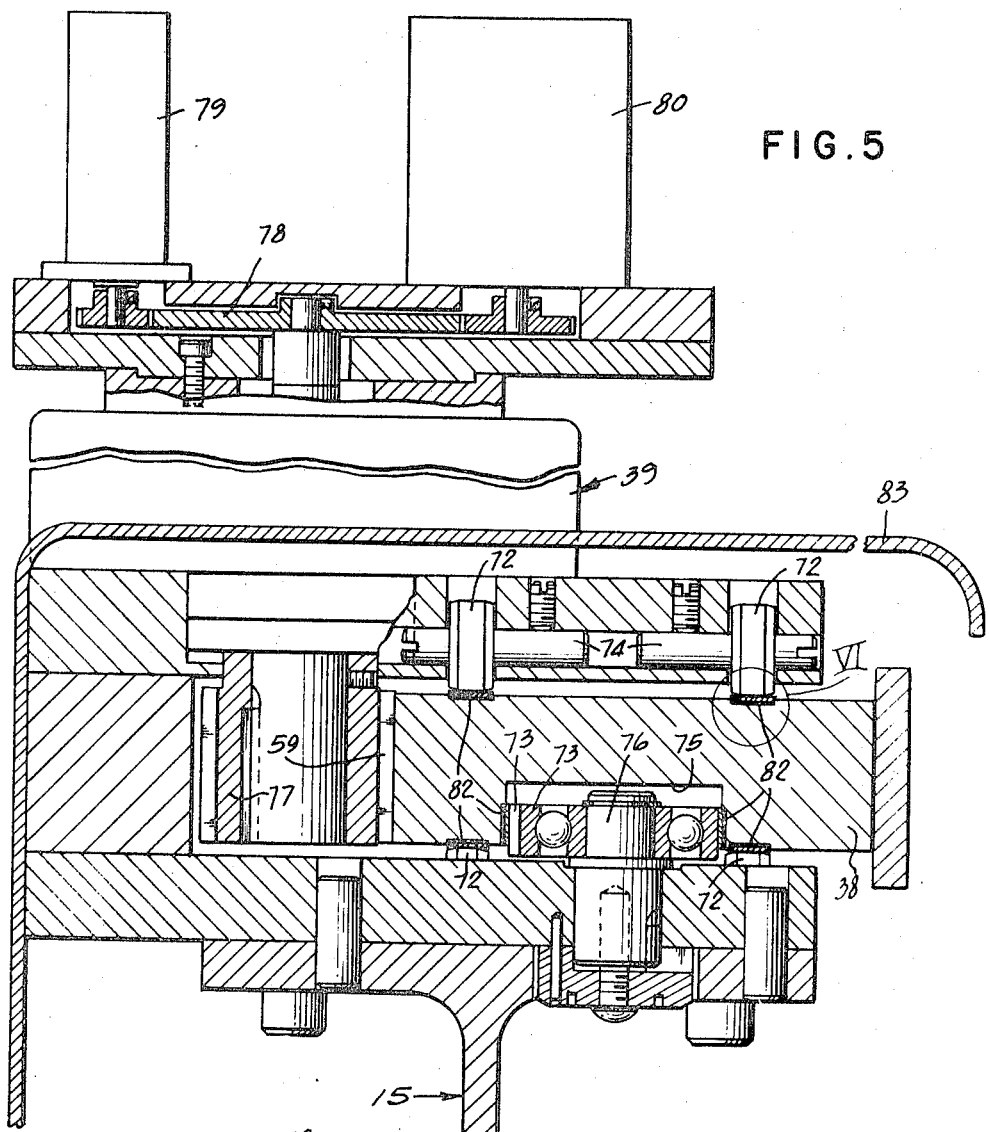
FIG. 5 is an enlarged fragmentary vertical cross-sectional view illustrating an X-axis positioning mechanism.
Figure 6:
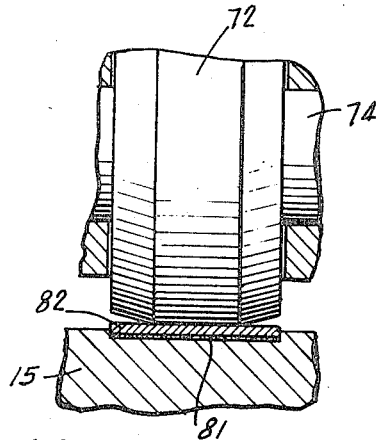
FIG. 6 is an enlarged view of a portion of FIG. 5 enclosed within a circle VI.

The linear extent of the workpiece moving mechanism 37 and the elongated rigid member 38 is shown in FIG. 4, while other details associated therewith are best seen in FIGS. 5 and 6. This mechanism has two functions, one of which is to reciprocate the workpiece in a longitudinal direction referred to as the X-axis, and the other function is to provide a reference surface so that when the workpiece 18 is loaded into the machine by being moved such as manually in the Y-axis to engage the clamps 40, the extent of such movement is predetermined and fixed in part indirectly by the rigid member 38. The elongated rigid member or gib 38 is provided with a series of individually adjustable rollers which support and guide such member 38, such rollers being indicated at 72, 73. As shown in FIG. 5, the base 15 includes a rigid bracket or supporting portion having a generally C-shaped cross-sectional configuration within which the rigid member 38 is disposed and by which the rollers 72, 73 are carried. In view of the fact that the rigid member 38 has a typical length of 11 feet for handling a 10-foot workpiece, the roller structure illustrated and described is repeated incrementally throughout the more than 20-foot extent of the base 15 so that as the rigid member 38 is reciprocated, it is similarly guided and supported for all positions. The rollers 72 are carried on eccentric pins 74 which are rotatably or adjustably supported in horizontal positions above and below the rigid member 38, each having a slot to facilitate rotation, and a set screw for locking a selected position. The rigid member has a downwardly directed groove 75 extending throughout its length within which the rollers 73 are disposed, successive rollers 73 engaging opposite sides of the groove 75. Each roller 73 is carried by an eccentric pin 76 which is keyed to a pin cap that is locked to the base 15.

The rigid member 38 is a rack which has the teeth 59 which is reciprocated by the motor 38, and to this end, the motor 39 has a pinion 77 keyed thereto and disposed in mesh with the teeth 59 which preferably are of the wedging type. Only a single rack and a single pinion is employed, such pinion 77 being carried at one end of the shaft of the motor 39. At the opposite end of such shaft, there is disposed a gear 78 which coacts with the input gear of a velocity signal generator 79 and also with the input gear of a position indicator or transducer such as of the pulse type, indicated at 80. Thus only the one rack 59 which meshes with only one pinion is employed for the purpose of moving the workpiece, sensing its velocity of movement, and reading its position. The velocity generator 79 and the position indicator 80 are conventional components, and similar components are employed in the Y-axis drive.

The manufacture of the rigid member 38 with the rack 59 thereon entails certain problems. The rigid member 38 is first ground to a suitable finish and flatness, and thereafter the teeth of the rack 59 are hobbed. To provide wear resistance at the point where the various rollers 72, 73 engage the rigid member 38, it would be possible under prior practice to provide thick hardened strips to be secured to the rigid member 38 as by screws, coupled with grinding of such strips if necessary. This structural arrangement uses a considerable amount of material and space and entails the reciprocation of a considerable mass. The structure disclosed and described below uses somewhat less material and less space, and yet is of such construction as to remain straight and wear resistant throughout its length. It is therefore preferred that there be applied a film of synthetic adhesive illustrated in enlarged form for clarity at 81 to which there is applied a hard ground strip of flexible tool steel such as that from which band saw blades are made (but without teeth). This also could be ground if needed. A typical thickness of this strip is .020″, and its width is up to ½ inch. A screw (not shown) may be used at each end to prevent delaminating There are many adhesives that will not stick. Also, liquid or paste adhesives would provide a variable thickness, and either usually would not stick or would need heat curing. Such heat curing could be expected to damage the straightness of the rigid member 38. It is therefore preferred that the film 81 of synthetic adhesive comprise a dry removal adhesive transfer tape, which is a film of tape which is pressure sensitive or tacky on both sides. Examples of suitable material include that sold by Minnesota Mining & Manufacturing Co. as No. 465 and as No. 466 pressure sensitive film. One such strip of flexible tool steel 82 is embedded in a slight recess in the rigid member 38 at each of opposite sides of the groove 75, at each of opposite sides of the lower surface, and at each of opposite sides of the upper surface.

Preferably, a guard 83 overhangs the mechanism just described.

The motor 39 has been illustrated in FIG. 2 in a location which is schematic, while the location in FIG. 4 is that which is preferred. The motor 39 may be made of such capacity as to enable the workpiece moving mechanism 37 to draw strip form of workpiece from a roll stand and through straightening rolls (not shown).

Y-AXIS DRIVE

The motor 35 shown in FIGS. 2 and 4 cooperates with the rack 58 shown in FIG. 4, and includes a velocity sensing device and a position sensing device as explained in connection with the foregoing description of the X-axis mechanism, and as shown in FIG. 5.

RAM DETAILS

Figure 8:
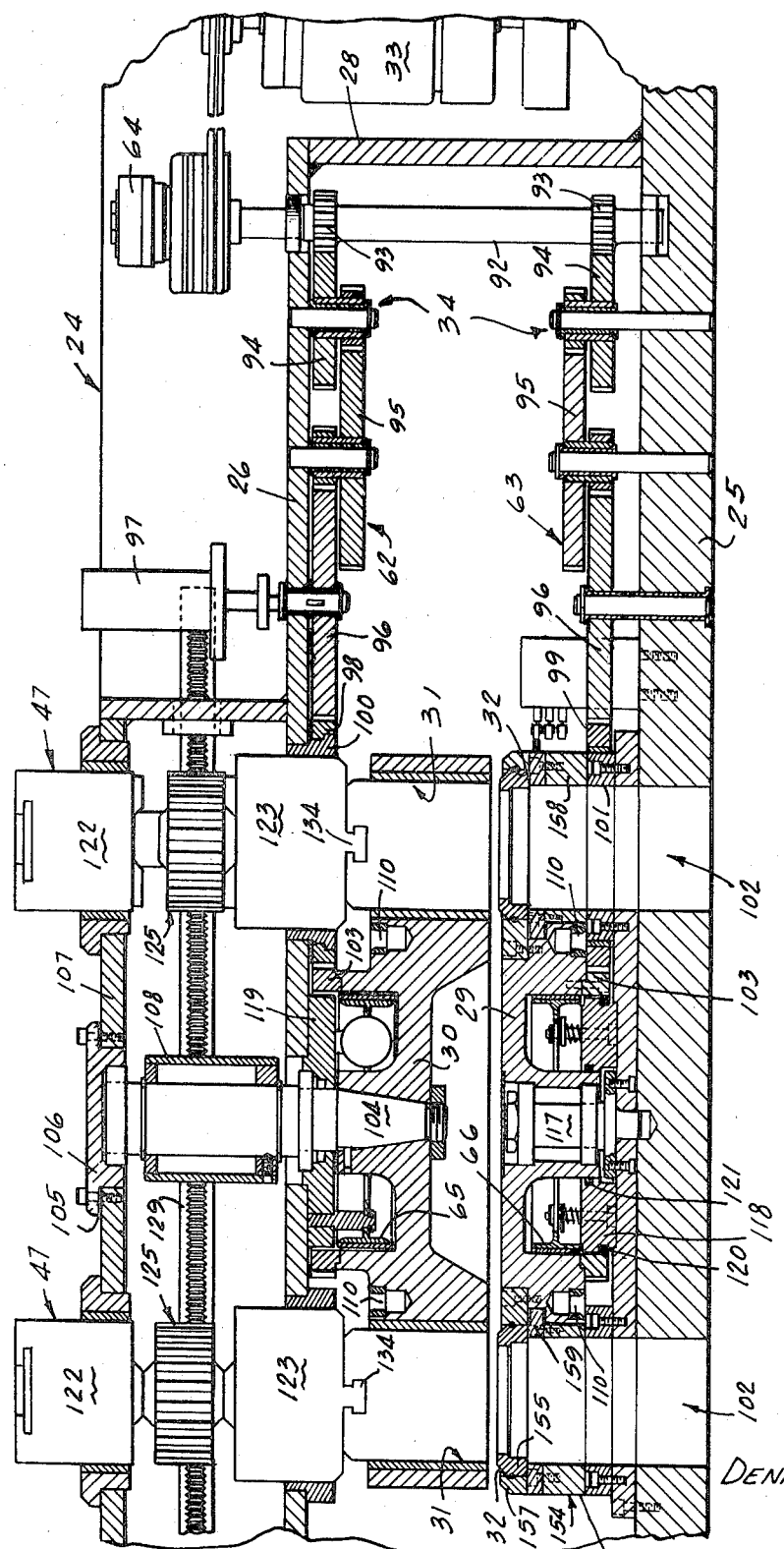
FIG. 8 is an enlarged view of a portion of FIG. 7 and shown in vertical cross section, illustrating the turrets, their rams and their angular drive means.

The two rams or ram assemblies 47 which are reciprocated by the driven ram 46, are best illustrated in association with other components in FIG. 8, and internally in FIG. 11. Each ram assembly 47 includes an upper non-rotatable secton 122, a lower non-rotatable section 123 joined together by means providing a lost motion connection 124. A rotatable section 125 is disposed between the sections 122, 123. Each of the sections 122, 123 has an axially facing cam surface 126 directed toward the rotatable section 125 which has corresponding or complemental cam surfaces 127 which face axially toward the cam surfaces 126 for abutment therewith or for interfitting therewith. The rotatable section 125 is rotatably supported and carried on a stem 128 which forms a part of the lost motion connection 124, and in effect comprises a rotatable wedge which either takes up substantially all of the freedom permitted by the lost motion connection 124, or which permits the same. As shown in FIG. 8, the rotatable wedge section 125 is positioned so that the highest points of the cam surfaces 126, 127 are in position to engage each other, while the rotatable wedge section 125 of the right-hand ram assembly 47 is positioned so that the cam surfaces 126, 127 are in an interfitting relationship.

Means are provided for positioning one of the rotatable sections 125 in a punching-effecting angular position, and for positioning the other rotatable sections 125 in an idling position. To this end, there is provided an elongated rack 129 which has teeth which mesh with gear teeth on the external periphery of the rotatable sections 125. The rack 129 is slidably guided on the upper arm 26 and is reciprocated by an actuator 130 (FIG. 7) to place one of the ram assemblies 47 in an active position and one in an inactive or idling position.

The driven ram 46 transmits punching force through the ram assembly 47 with only guidance provided by the bearings that perform guidance for the upper arm 26. Similarly during punching, all reactive forces are transmitted through the driven ram 46 so that there is no tendency whatever for the frame 26 to breathe or to otherwise lose its ability to provide precise guidance during all portions of the punching stroke.

The upper end of the upper sections 122 comprises a T-head which is received in a T-slot on the lower end of the driven ram 46. As the frame reciprocates in the Y-axis, namely in a direction perpendicular to the drawing of FIG. 4, the T-head and slot connection between the ram assembly 47 and the driven ram 46 remains at all times engaged so that the driven ram 46 can drive the ram assembly 47 at any place where the frame 24 may be stopped. This connection also precludes rotation of the upper sections 122. The lower end of the sections 123 is similarly provided with a T-head 134 for reception in a corresponding T-slot in the tooling carried in each turret station as shown in FIG. 8. The weight of both of the ram assemblies 47, and the driven ram 46 is carried as shown in FIG. 7 by an air balance 135 secured to the spanning structure 22. The air balance 135 is of conventional construction. By this arrangement, the static mass is not carried by the shaft 43. Yet the air balances 135 hold the ram means 45 at such a height that the T-head 134 can make and can release its connection with the tooling and the turret in response to rotation of the upper turret.

As seen in FIG. 11, the lower section 123 of the ram assembly 47 resembles an inverted cup. The stem 128 has a slidable connection with the upper section 122 and with the rotatable section 125 and is rigidly secured to the lower section 123, extending into the interior thereof where it has a cylindrical enlargement 136 spaced from an inner wall 137 of the lower section 123 to define an annular chamber 138 within which there is slidably disposed and guided a fluid-pressure biased piston 139. A fluid pressure line 140 leads through a slot in the upper section 122 and communicates with a passage 141 that leads to the chamber 138. On application of fluid pressure to the chamber 138, the piston 139 is biased in a downward direction to a position limited by a ram plate 142 which is secured centrally and peripherally to the stem 128 and which has the T-head 134 integral therewith. The piston 139 at its lower end has an inwardly directed annular shoulder 143 which is apertured so that suitable spacers 144 may pass therethrough. The outer periphery of the ram plate 142 has a series of alternately spaced fingers 145 and spaces 146 while the lower end of the piston 139 has a series of alternately spaced fingers 147 extending into the spaces 146. The ram plate 142 also has a number of trapped plungers 148 which are engageable with the annular shoulder 143. When pressure is applied to the chamber 138, it in effect serves as a spring urging the piston 139 downwardly for acting on a number of transfer pins 149 which form part of the stripping member that is a part of the tooling carried in the turret. Thus, a stripping force is made available for transfer to a stripping member. The details of the punch, die, and stripper, which form a set, do not form an essential part of the punch press of this invention, and may vary a good deal. To that end, particularly where smaller tooling is employed, the stripper pins 149 may be located somewhat closer to the center, such as for engaging the transfer plugs 148. It is thus desirable that the lower section 123 of the ram means 47 have a selection and an array of transfer plugs 148 or fingers 147 for coaction with a wide variety of types and sizes and styles of tooling. The entire lower surface of the upper section 122 and both surfaces of the rotatable section 125 serve to transmit punching force to the upper surface of the lower section 123. Punching force is transmitted not only through its outer portion, but is transmitted centrally to the enlargement on the stem 128 and by it to the central lower portion of the stem 128 and through the spacers 144 to the ram plate 142.

TOOLING STATION ARRANGEMENTS

Certain tooling is illustrated in FIG. 8 including dies that are representative of actual maximum size dies, for example dies provided with 5-inch openings. The illustration of the tooling cooperating therewith is schematic in nature and represents the maximum external envelope size to be occupied by the stripping and punching elements so that the actual punch size would be one that corresponds to the illustrated die and which is to be reciprocated by the head 134, while the somewhat larger dimension at the tooling station 31 also represents the space to be occupied by the stripping means mentioned above. While there is no limit on how small the actual punch tip might be that is associated in the illustrated tooling envelope, and while there is no limitation on how small the opening in the die may be, it is not practicable to make all of the stations 31, 32 of a size to enable every station to take maximum size tooling.

The number of large stations to be provided, such as illustrated, the number of intermediate size stations, and the number of minimum size stations to be employed in a particular press is to some extent a matter of choice based on probabilities of usage. But once the choice has been made, there are certain basic principles of construction to be followed in building a particular punch press. For example, it is preferable that for every station, there be a diametrically opposite station. Such an arrangement will insure that no matter which station is selected for punching, a second station will be simultaneously placed in alignment. As another example, where different size stations are to be employed, it is preferable that a station of like size be employed diametrically opposite thereto so as to minimize the unbalanced forces on the upper turret.

An example of a useful basic arrangement appears in FIG. 4 which meets the principles just described. A turret or dial of FIG. 4 includes two sizes of tooling envelope. By use of smaller tooling stations, a greater number of tooling stations can be accommodated.

MOVABLE BOLSTER

Figure 9:
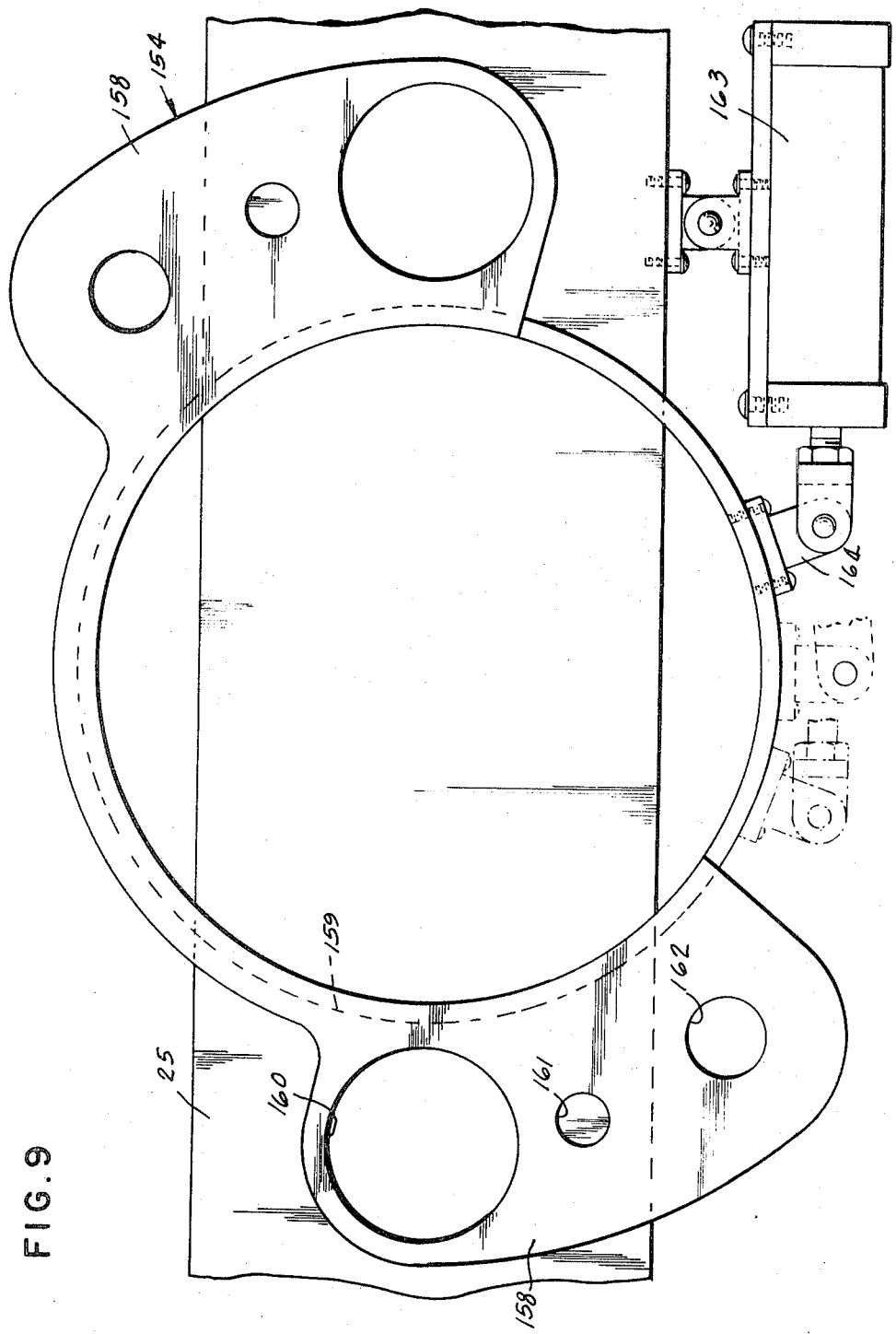
FIG. 9 is a top view of an adjustable die bolster whereby other parts have been omitted for clarity of illustration.
Figure 10:
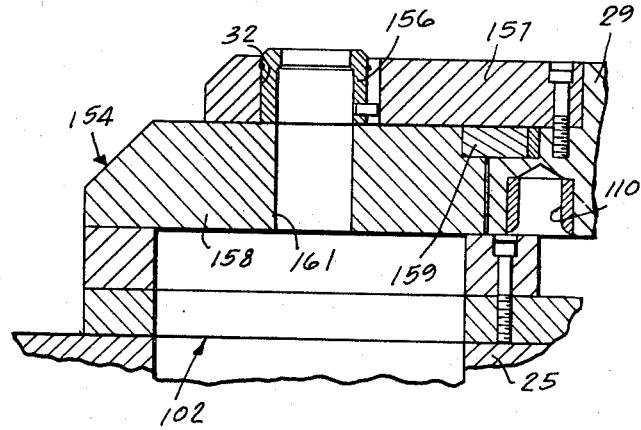
FIG. 10 is a fragmentary cross-sectional view taken through a portion of the die bolster of FIG. 9 showing coacting elements.

The use of tooling which enables the punching of a five-inch hole by means of a die carried in a turret coupled with the use of a die having an envelope size smaller than the largest die opening to be accommodated provides a problem in die support which is solved by use of a movable bolster, generally indicated at 154 in FIG. 8 disposed above a fixed bolster ring 101 and also shown in FIG. 9. To paraphrase the problem, attention is invited to FIG. 8 which shows a die 155 which has a five-inch die opening leading to the slug chute 102 which of necessity is somewhat larger. The slug chute 102 is also shown in FIG. 10 in conjunction with a die 156 which has an outside diameter on the order of two inches or less which would freely drop through the die chute 102 but for the presence of the bolster 154. The lower turret 29 has a dial 157 secured thereto and which has tooling stations such as 32 previously described. The dial 157 is co-rotatable with the turret 29. The bolster 154 has a kidney-shaped section 158 which is secured as by screws or welding to an arcuate or ring portion 159 which is guided at its inner periphery on an outwardly directed surface of the lower turret 29 for being moved about the rotational axis of the turret 29. The bolster section 158 fills in a space between the lower frame arm 25 and the lower surface of the die 155 so that reactive punching forces may be transmitted vertically therethrough, while providing for passage of any slugs to the slug chute 102. Where two punching stations are employed, as disclosed here, a second bolster section 158 is employed in conjunction with that station.

As seen in FIGS. 8 and 9, the bolster section 158 has one aperture 160 which corresponds in size to that of the slug chute 102, and has two smaller angularly spaced apertures 161, 162, the aperture 161 cooperating with the most common or smallest tooling, while the aperture 162 is provided to cooperate with intermediate size tooling.

When tooling is employed that has only two sizes of envelope as shown in FIG. 4, the section 158 needs only to have two sizes of aperture. However, it is still desirable to include a portion or space for the third aperture, with that aperture omitted, such portion enabling the user to put in tooling wherein no slug is created. At any event, in conjunction with use of the punch press disclosed herein, the bolster 154 is positioned about the turret axis so as to dispose an appropriate portion beneath the die to be used.

While such positioning may be done by hand, it is preferable to employ an actuator 163 which is connected to act between the frame 25 and the bolster 154, the actuator 163 being extendible to the positions shown in broken lines for positioning the various bolster portions in alignment with the ram means 47. In the structure of FIG. 9, the actuator 163 is pivotally carried on one side of the lower arm 25 of the frame 24, its rod end being pivotally connected to a depending bracket 164 carried by the bolster ring 159.

A code drum 108 (FIG. 8) could be employed to act thru a switch (not shown) to command or control the proper position of the bolster 154. For example, such switch could signal the actuator 163 to position the bolster 154 with that portion of it having the corresponding hole size disposed in an operating position.

However, it is preferable that the bolster 154 be programmed independently to enable a freedom of choice as to which bolster portion is to be used.

Figure 12:
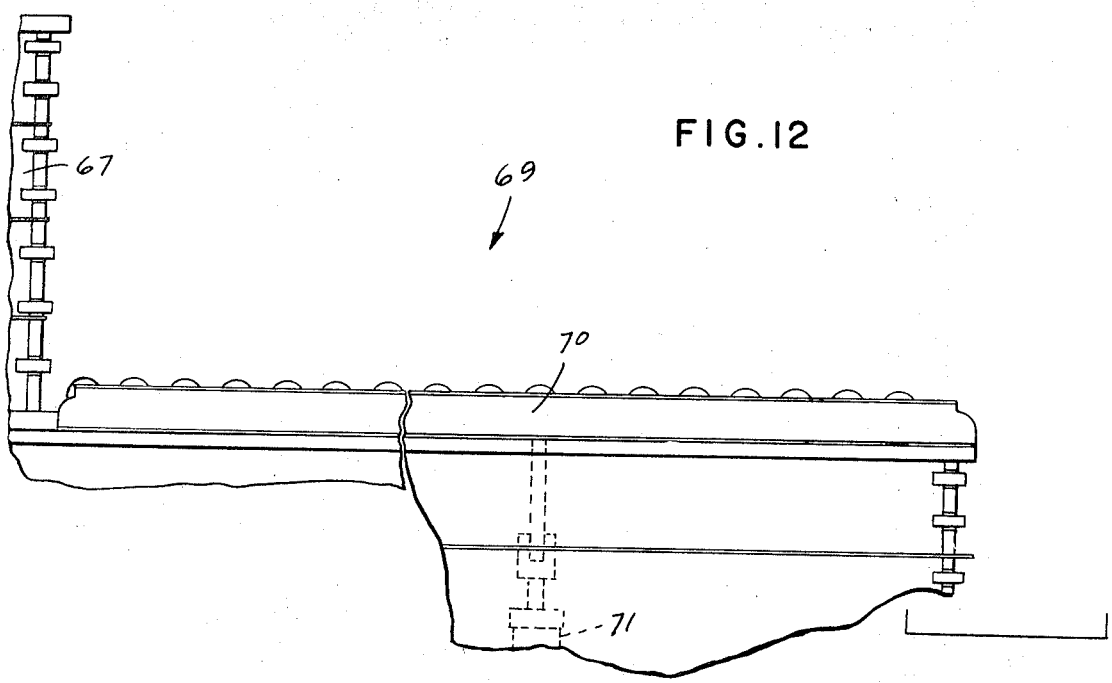
FIG. 12 shows a modified form of adjustable bolster.

A preferred form of movable bolster is shown in outline in FIG. 12 and includes a movable bolster 165 having portions with apertures 166, 167, 168 corresponding to the apertures 160, 161, 162 for alignment with the ram means. The bolster 165 has an arcuate portion 169 guided as explained before. As best seen in FIG. 13, the bolster 165 has a pair of actuators 170, 171 having cylinder portions connected together in an end-to-end relationship and each having a rod 172, 173. The rod 172 is rigidly coupled to a bracket carried on the side of the lower frame arm 25, and the rod 173 is secured to a bracket 174 that is connected to a rigid bar 175 which extends in parallel relation to the actuators 170, 171. At their rod ends, each of the actuators 170, 171 has a further bracket 176 which has a support wheel 177 rolling on the transverse support surface 19 of the base 15. The brackets 176 have bearings which slidably receive and guide the rigid bar 175. Near its midpoint, the rigid bar 175 has a pin and slot connection generally indicated at 178. The bolster 165 comprises two sections which are pinned and bolted together and held by a plate 179 to facilitate assembly onto the turret. The pin and slot connection comprises a radially directed slot 180 in the plate 179 and the pin comprises a roller bearing 181 slidably disposed therein.

As drawn in FIGS. 12 and 13, the parts are in a centered position wherein the apertures 167 are aligned with the punching station. On retraction of the rod of the actuator 170, the two actuators are shifted to the left as shown in FIG. 13, causing the bolster 165 to pivot in a clockwise direction as shown in FIG. 12, to align the larger holes 166 with the rams. When both of the actuators 170, 171 are extended, the bolster 165 is pivoted in the opposite direction by a like amount. The periphery of the bolster 165 includes three vertical slots 182 spaced apart angularly by the angular spacing between the apertures 166–168. Within each of the slots 182, there is provided a binary code member 183, 184 (FIGS. 14–16) positioned at a selected height to coact with one of a group of control switches generally indicated at 185.

The frame 25 may be provided with a wear strip 186 as shown in FIG. 13.

I claim as my invention:

1. A punch press comprising in combination:
   (a) a frame having spaced arms with a reciprocable ram disposed at the upper arm, and means for supporting a workpiece at the lower arm;
   (b) vertically stationary means for being carried by said frame for reciprocably guiding punching means of differing envelope size in alignment with said ram; and
   (c) means for supporting die means of differing envelope size on said lower arm in position to coact with the punching means, said die support means including a horizontally movable bolster disposed and guided between the die means and the lower of said arms, and having at least two portions each directly engageable with the lower side of the die means and positionable selectably in alignment with said ram means and through which portions reactive die supporting force is transmitted during punching, said portions having slug chutes of differing size extending therethrough for cooperation with said die means having envelopes of differing size.

2. A punch press as claimed in claim 1, which includes means carried at said lower arm and connected to said movable bolster for positioning it with a selected one of said portions in alignment with the ram.

3. A punch press as claimed in claim 1 including:
   (a) a plurality of such punching means, each of which has a stripper means which is guided with the corresponding punching means by said vertically stationary means, each of said punching means having a means for being horizontally connected to and detached from said ram; and
   (b) a fluid pressure biased piston slidably disposed in said ram, and having means retained in said ram for transmitting a stripping force to said stripper means, and separable from said stripper means in response to the detachment of said punching means from said ram.

4. A punch press comprising in combination:
   (a) a frame having spaced arms with a reciprocable ram disposed at the upper arm, and means for supporting a workpiece at the lower arm;
   (b) a punch and stripper means, said punch having a horizontally detachable connection with said ram;
   (c) vertically stationary means carried by said frame for reciprocably guiding said punch and stripper means;
   (d) means for supporting die means on said lower arm in position to coact with the punching means; and
   (e) a fluid pressure biased piston slidably disposed in said ram, and having means retained in said ram for transmitting a stripping force to said stripper means, and separable from said stripper means in response to the detachment of said punch from said ram.

5. A punch press according to claim 4, in which said piston is axially hollow for enabling punching force to be exerted through its central opening.

6. A punch press according to claim 4 in which said transmitting means are disposed at differently spaced distances from center to accommodate tooling of differing size envelopes.

7. A punch press according to claim 3, in which said piston is axially hollow for enabling punching force to be exerted through its central opening.

8. A punch press according to claim 3, in which said transmitting means are disposed at differently spaced distances from center to accommodate tooling of differing size envelopes.

9. A punch press according to claim 1, in which an actuator means is connected to act between said frame and said movable bolster for moving said bolster.

10. A punch press according to claim 9, in which said actuator means has a pivotal connection between its cylinder and said frame, and a pivotal connection between its rod and said bolster.

11. A punch press according to claim 9, in which said actuator means comprises two actuators whose cylinders are connected together end-to-end, the rod of one actuator being connected to said frame and the rod of the other actuator being connected to a rigid bar extending parallel to said actuators and having external sliding connections with their cylinders, there being a pin and slot connection between said rigid bar and said bolster.

12. A punch press according to claim 9, in which said actuator means has support wheel means carried by its cylinder and rolling on said base.

13. A punch press according to claim 9, in which said bolster is provided with digital code means, and which includes a sensing head responsive to said code means for controlling said actuator means to enable programming of said bolster independent of whatever punching means may be aligned with said ram.

References Cited

UNITED STATES PATENTS

| | | | |
|---|---|---|---|
| 3,174,378 | 3/1965 | Friedland et al. | 83—552 X |
| 3,119,292 | 1/1964 | Schmid | 83—137 X |

ANDREW R. JUHASZ, Primary Examiner

J. F. COAN, Assistant Examiner

U.S. Cl. XR.

83—71, 151, 409, 551